April 16, 1929.  F. LANE  1,709,531
BURR EXTRACTOR AND COTTON CLEANER
Filed July 20, 1925  3 Sheets-Sheet 2
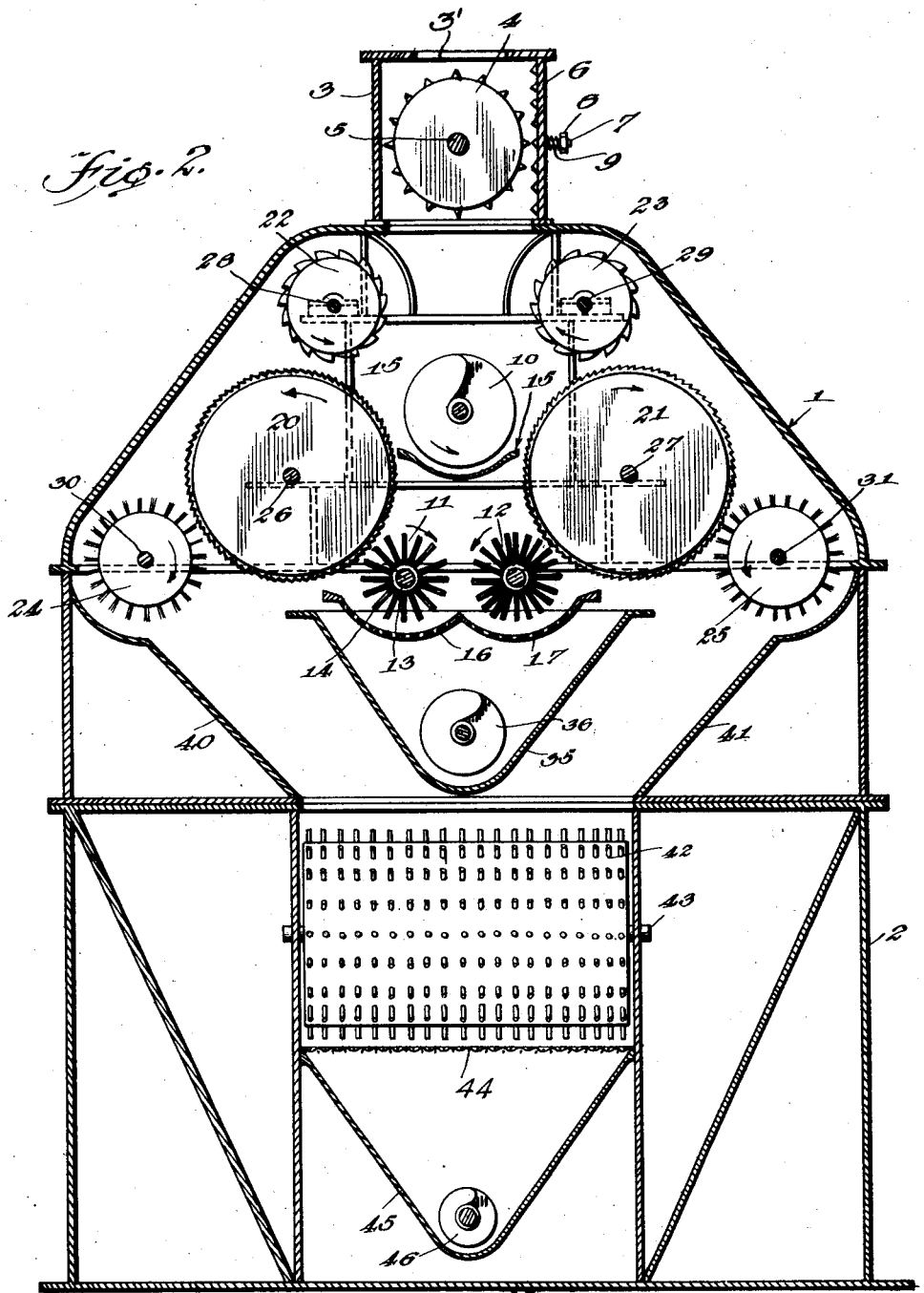
WITNESSES
INVENTOR
Fletcher Lane,
BY
ATTORNEYS April 16, 1929.  F. LANE  1,709,531
BURR EXTRACTOR AND COTTON CLEANER
Filed July 20, 1925  3 Sheets-Sheet 3
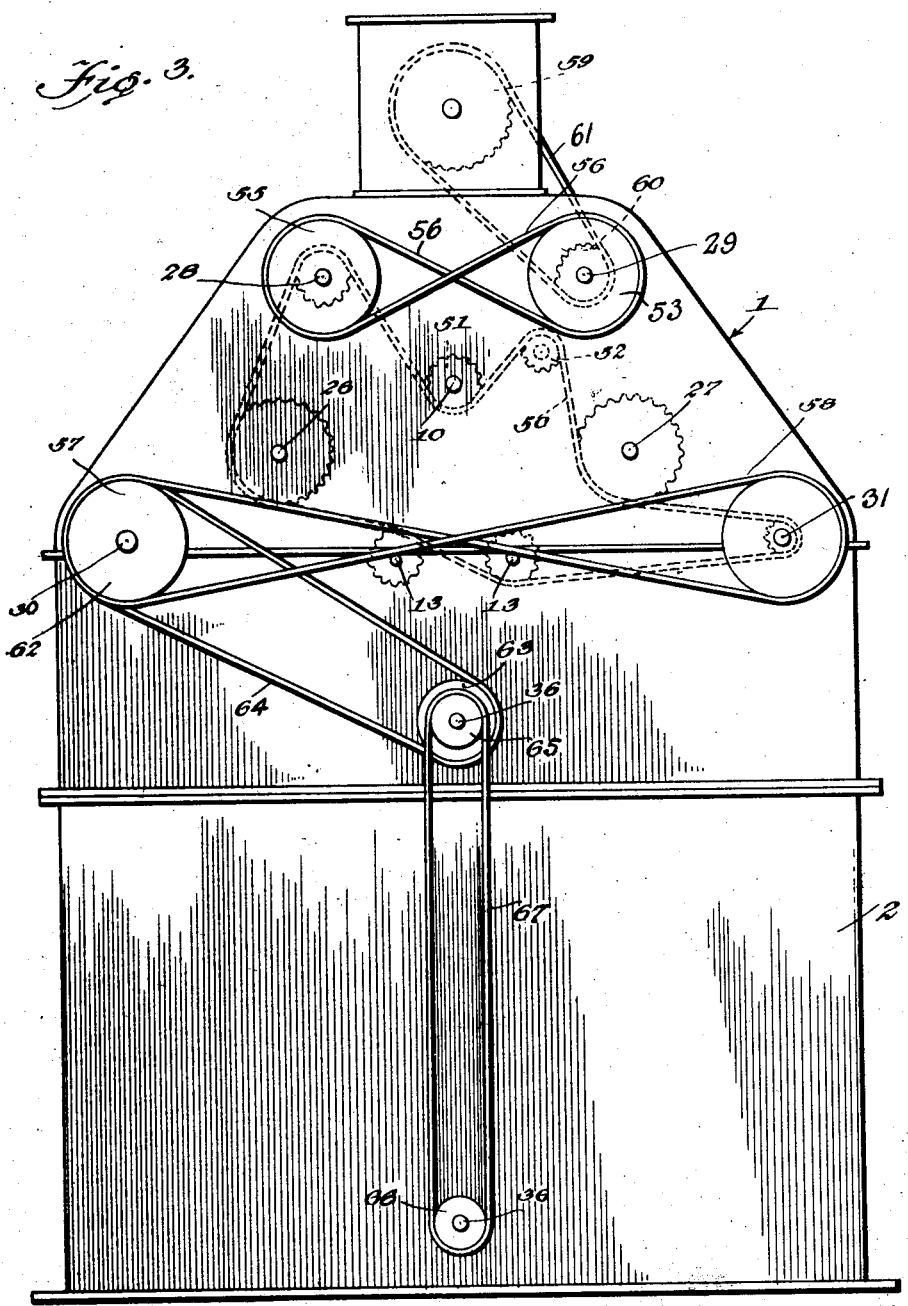

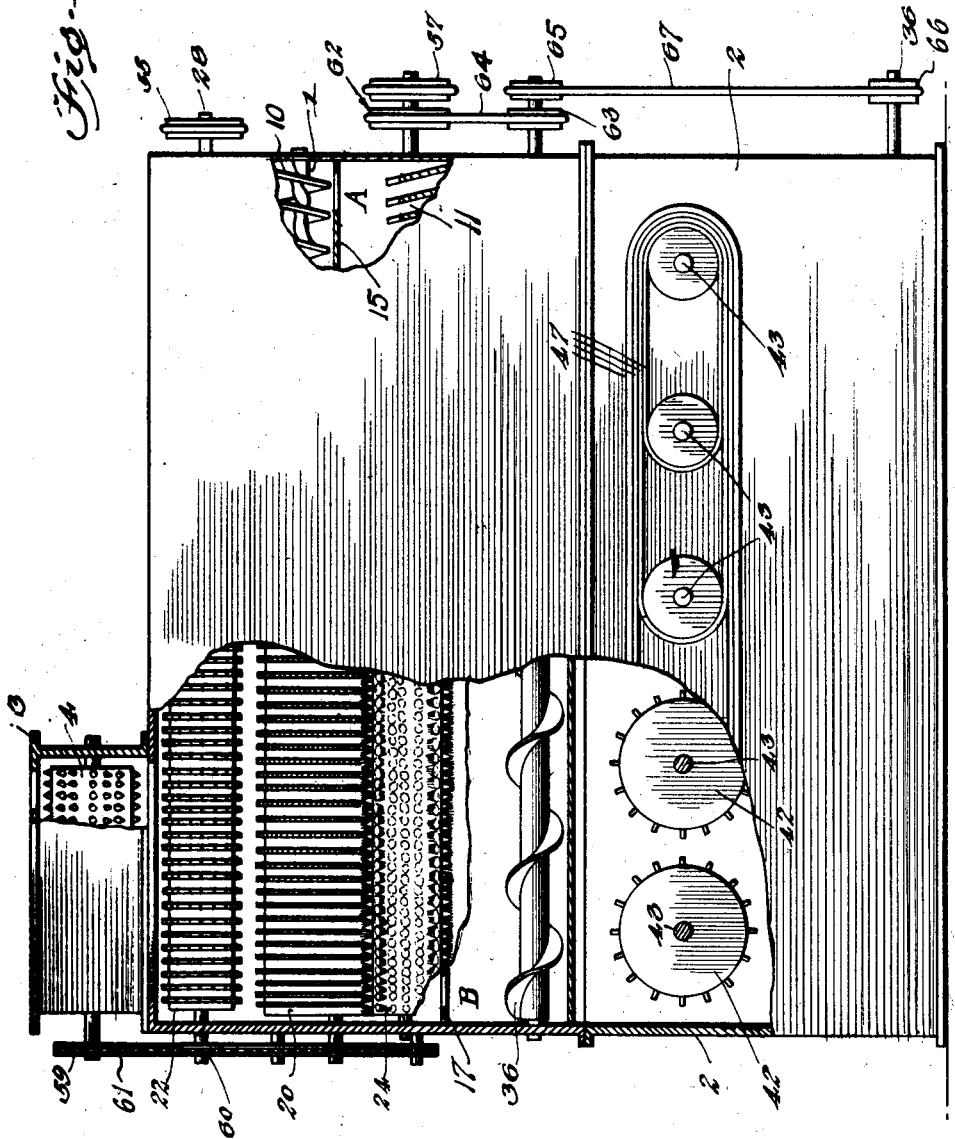

Patented Apr. 16, 1929.

1,709,531

UNITED STATES PATENT OFFICE.

FLETCHER LANE, OF ELK CITY, OKLAHOMA, ASSIGNOR OF ONE-THIRD TO ELK MANUFACTURING COMPANY, OF ELK CITY, OKLAHOMA, A CORPORATION OF OKLAHOMA, AND ONE-THIRD TO J. D. GARNETT, OF ELK CITY, OKLAHOMA.

BURR EXTRACTOR AND COTTON CLEANER.

Application filed July 20, 1925. Serial No. 44,833.

This invention relates to an improvement in burr extractors and cotton cleaners, and has for its object to provide a machine of this character which first extracts the burrs and then cleans the cotton, thereby reducing to a minimum the motion of cotton and enhancing the quality thereof and which also increases the value of the cotton seed since the machine constituting the present invention removes all foreign matter and leaves none mixed with the cotton or seed.

A further object is to provide a machine of this character and having these advantages and capacities and which is of simple and durable construction, reliable and efficient in operation and easy and comparatively inexpensive to manufacture and operate.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in longitudinal vertical section showing a machine constructed in accordance with the present invention, Figure 2 is a view in transverse vertical section of the machine shown in Fig. 1, and Figure 3 is a view in end elevation.

Referring to the drawings the numeral 1 designates a suitable casing or housing mounted on a suitable frame 2. The cotton is fed into a breaker, designated generally at 3 having an opening 3' and having a toothed breaker element 4 rotated in the breaker casing by means of a shaft 5 and cooperable with a toothed breaker plate 6 adjustable toward and away from the drum 4 by virtue of its mounting on bolts 7 fixed to the breaker housing and extending through openings in the plate 6 and by virtue of the provision of nuts 8 on the bolts 7, the nuts 8 serving to tension the coil springs 9 which press the plate 6 toward the breaker element 4.

After passing through the breaker the cotton drops onto a spiral conveyor 10 extending longitudinally through the housing 1. The breaker 3 is located at one end of the machine and the cotton which drops therefrom onto the conveyor 10 is carried the entire length of the machine and then dropped onto the combination conveyors and pickers, designated at 11 and 12. The conveyor 10 is a plain spiral conveyor. The conveyors 11 and 12 are of identical construction and each includes an axial shaft 13 and radial teeth 14 extending spirally around the shaft 13. The conveyor 10 operates in conjunction with a trough or arcuate way 15 and the combined pickers and conveyors 11 and 12 operate in conjunction with similar though perforated ways and troughs, designated at 16 and 17.

Rotary saw assemblies 20 and 21 are cooperatively mounted with respect to the conveyors 10, 11 and 12. Strippers 22 and 23 are co-operatively disposed with respect to the saw assemblies 20 and 21. Brushes 24 and 25 are also cooperatively associated with the saw assemblies. The saw assemblies 20 and 21, strippers 22 and 23 and brushes 24 and 25 extend longitudinally of the casing and are carried by shafts 26, 27, 28, 29, 30 and 31, respectively. The trough 15 is imperforate from the end at which it receives the cotton from the breaker to its opposite end and where it is provided with an opening A to permit the cotton to drop onto the combination pickers and conveyors 11 and 12.

The troughs 16 and 17 are perforate or of screen from the end at which they receive the cotton from the conveyor 10 to their opposite end which underlies the breaker and they are provided with openings B to permit the burrs to drop into a discharge trough 35 in which a spiral discharge conveyor 36 operates. The cotton which is delivered from the breaker 3 to the conveyor 10 is carried by the conveyor 10 along the machine between the saw assemblies. The saws of the saw assemblies pick up the cotton and any burrs that are taken up are thrown from the saw assemblies back to the conveyor 10 by the strippers 22 and 23. The cotton after having passed through the conveyor 10 is delivered to the combination pickers and conveyors 11 and 12 and the burrs remaining with the cotton are also delivered to the combination pickers and conveyors 11 and 12. The saws of the saw assemblies also pick up the cotton remaining on the combination conveyors and pickers 11 and 12 and any burrs that are picked up are knocked off of the saw assemblies by the strippers. The tendency of the burrs, trash and foreign matter when delivered to the combination conveyors and pickers 11 and 12 is to remain in the troughs 16 and 17 and to be advanced along these troughs to the discharge by the combination conveyors and pickers 11 and 12. The cotton which is picked up by the saw assemblies is removed from the saw assemblies by the brushes 24 and 25 and slides down chutes 40 and 41 onto transversely extending spiked cylinders 42 mounted on shafts 43 extending across the casing and operating over a screen 44, whereby the cotton is further cleaned and dirt, shale, trash or other foreign matter remaining with the cotton passes through the screen 44 into a hopper 45 from which it is discharged by a spiral conveyor 46.

Referring to Figure 1, one of the shafts 43 of the spiked cylinders is directly driven and the remaining cylinders are driven from said first mentioned cylinder by means of overlapping belts 47 engaging pulleys mounted upon the shafts of the respective cylinders.

A sprocket chain 50 engages sprockets mounted upon the shaft of the conveyor 10, the saw shafts 26 and 27, the stripper shaft 28, the shafts 13 of the combined pickers and conveyors and the shaft 31 of one of the brushes and over a tensioning sprocket wheel 52, and serves to drive these parts. A pulley wheel 53 mounted upon the shaft 29 of one of the strippers and a pulley wheel 55 mounted upon the shaft 28 of the other stripper are engaged by a twisted belt 56 whereby the stripper 23 is actuated. The shaft 30 of one of the brushes carries a pulley 57 and the shaft 31 of the other brush carries a similar pulley, which pulleys are engaged by a twisted belt 58 so that the brush 24 is operated from the shaft 31. The shaft 5 of the breaker is driven from the shaft 29 by means of sprockets 59 and 60 mounted on said shafts and a sprocket chain 61 engaging over said sprockets. The shaft 30 of the brush 24 carries a second pulley wheel 62 and the shaft of the conveyor 36 carries a pulley wheel 63. Over the pulley wheels 62 and 63 travels a belt 64 for operating the conveyor shaft. The shaft of the conveyor 36 is provided with a second pulley wheel 65 and the shaft of the conveyor 46 is provided with a pulley wheel 66. A belt 67 engages the pulley wheels 65 and 66 to operate the conveyor 46.

In this manner all of the parts may be driven from a single directly driven shaft as found most convenient.

I claim:

1. A burr extractor and cotton cleaner comprising a casing, a pair of oppositely rotating saw assemblies arranged in the casing, a conveyor receiving the cotton and extending along and between the saw assemblies, strippers associated with the saw assemblies and adapted to knock the burrs from the saw assemblies back to the conveyor, a pair of combination conveyors and pickers extending between the saw assemblies below said conveyor, troughs associated with the conveyor and with the combination conveyors and pickers, said conveyor delivering the cotton to said combination conveyors and pickers after having passed the same along the saw assemblies for their full length, the troughs associated with the combination conveyors and pickers having a discharge for the burrs at their ends remote from the point where they receive the cotton from the conveyor.

2. A burr extractor and cotton cleaner comprising a casing, a pair of oppositely rotating saw assemblies arranged in the casing, a conveyor receiving the cotton and extending along and between the saw assemblies, strippers associated with the saw assemblies and adapted to knock the burrs from the saw assemblies back to the conveyor, a pair of combination conveyors and pickers extending between the saw assemblies below said conveyor, troughs associated with the conveyor and with the combination conveyors and pickers, said conveyor delivering the cotton to said combination conveyors and pickers after having passed the same along the saw assemblies for their full length, the troughs associated with the combination conveyors and pickers having a discharge for the burrs at their ends remote from the point where they receive the cotton from the conveyor, chutes leading from the assemblies, a plurality of spiked cylinders receiving the cotton from the chutes, and a screen co-operable with the spiked cylinders.

3. A burr extractor and cotton cleaner comprising a casing, a pair of oppositely rotating saw assemblies arranged in the casing, a conveyor receiving the cotton and extending along and between the saw assemblies, strippers associated with the saw assemblies and adapted to knock the burrs from the saw assemblies back to the conveyor, a pair of combination conveyors and pickers extending between the saw assemblies below said conveyor, troughs associated with the conveyor and with the combination conveyors and pickers, said conveyor delivering the cotton to said combination conveyors and pickers after having passed the same along the saw assemblies for their full length, the troughs associated with the combination conveyors and pickers having a discharge for the burrs at their ends remote from the point where they receive the cotton from the conveyor, chutes leading from the assemblies, a plurality of spiked cylinders receiving the cotton from the chutes, and a screen co-operable with the spiked cylinders, a trough receiving the dirt, trash and the like from the screen, and a spiral conveyor operating in the trough.

4. A hull extractor and cotton cleaner, including a pair of oppositely rotating saw assemblies, means for carrying the cotton back and forth between the assemblies, means for removing the burrs from the assemblies, and means for removing the cotton therefrom.

5. A hull extractor and cotton cleaner, including a pair of oppositely rotating saw assemblies, means for carrying the cotton back and forth between the assemblies, means for removing the burrs from the assemblies, means for removing the cotton therefrom, and means for further cleaning the cotton including a plurality of spiked rollers and a screen co-operable with the rollers.

6. A burr extractor and cotton cleaner comprising means for initially cleaning the cotton and extracting the burrs therefrom comprising conveyors passing the cotton back and forth in immediate contact with oppositely disposed saw assemblies, and means for further cleaning the cotton consisting of a plurality of transversely extending spiked rollers, and a screen co-operable with the rollers.

7. A hull extractor and cotton cleaner comprising a breaker device for initially acting upon the cotton and directly delivering the cotton into proximity with a pair of oppositely rotating saw assemblies, means for carrying the cotton back and forth between the assemblies, means for removing the burrs from the assemblies and means for removing the cotton therefrom.

8. A burr extractor and cotton cleaner comprising a breaker device, a pair of oppositely disposed saw assemblies disposed below said breaker device, conveyors arranged between said saw assemblies, one of said conveyors receiving the cotton directly from said breaker device whereby it is brought into contact with said assemblies, means for stripping trash from said saw assemblies, and means for removing the cotton fiber from said saw assemblies.

9. A hull extractor and cotton cleaner including a pair of oppositely disposed saw assemblies, means for carrying the cotton back and forth between said instrumentalities in immediate contact therewith, means for removing the burrs therefrom, and means for removing the cotton from said instrumentalities.

10. A hull extractor and cotton cleaner including a pair of oppositely rotating saw assemblies, means for carrying the cotton back and forth between said instrumentalities in immediate contact therewith, and means for removing the cotton from said instrumentalities.

11. A burr extractor and cotton cleaner comprising a casing, a pair of oppositely rotating saw assemblies arranged in the casing, a conveyor receiving the cotton and extending along and between the saw assemblies, strippers associated with the saw assemblies and adapted to knock the burrs from the saw assemblies back to the conveyor, a pair of combination conveyors and pickers extending between the saw assemblies below said conveyor, troughs associated with the conveyor and with the combination conveyors and pickers, said conveyor delivering the cotton to said combination conveyors and pickers after having passed the same along the saw assemblies for their full length, the troughs associated with the combination conveyors and pickers being perforated and having a discharge for the burrs at their ends remote from the point where they receive the cotton from the conveyor.

12. A burr extractor and cotton cleaner comprising a casing, a pair of oppositely rotating saw assemblies arranged in the casing, a conveyor receiving the cotton and extending along and between the saw assemblies, strippers associated with the saw assemblies and adapted to knock the burrs from the saw assemblies back to the conveyor, a pair of combination conveyors and pickers extending between the saw assemblies below said conveyor, troughs associated with the conveyor and with the combination conveyors and pickers, said conveyor delivering the cotton to said combination conveyors and pickers after having passed the same along the saw assemblies for their full length, the troughs associated with the combination conveyors and pickers being perforate and having a discharge for the burrs at their ends remote from the point where they receive the cotton from the conveyor, and a receiver below said perforate troughs having a conveyor therein for discharging material passing through said troughs from said receiver.

13. A burr extractor and cotton cleaner comprising a casing, a pair of oppositely rotating saw assemblies arranged in the casing, a conveyor receiving the cotton and extending along and between the saw assemblies, strippers associated with the saw assemblies and adapted to knock the burrs from the saw assemblies back to the conveyor, a pair of combination conveyors and pickers extending between the saw assemblies below said conveyor, means for stripping the cotton from said assemblies, troughs associated with the conveyor and with the combination conveyors and pickers, said conveyor delivering the cotton to said combination conveyors and pickers after having passed the same along the saw assemblies for their full length, the troughs associated with the combination conveyors and pickers having a discharge for the burrs at their ends remote from the point where they receive the cotton from the conveyor.

14. A burr extractor and cotton cleaner comprising a casing, a pair of oppositely rotating saw assemblies arranged in the casing, a conveyor receiving the cotton and extending along and between the saw assemblies, strippers associated with the saw assemblies and adapted to knock the burrs from the saw assemblies back to the conveyor, a pair of combination conveyors and pickers extending between the saw assemblies below said conveyor, means for stripping the cotton from said assemblies, troughs associated with the conveyor and with the combination conveyors and pickers, said conveyor delivering the cotton to said combination conveyors and pickers after having passed the same along the saw assemblies for their full length, the troughs associated with the combination conveyors and pickers having a discharge for the burrs at their ends remote from the point where they receive the cotton from the conveyor, and a chute adjacent said strippers and assemblies for receiving the cotton and delivering it to a further cleaning means.

15. A burr extractor and cotton cleaner comprising means for initially crushing the burrs and delivering them to a conveyor arranged between a pair of saw assemblies, the said conveyor carrying the cotton in intimate contact with the saw assemblies from one end thereof to the other, a trough beneath said conveyor having an opening therein at one end whereby any material remaining in the trough and conveyor will be passed therethrough, a second conveyor arranged beneath said first conveyor and receiving material discharged through the opening in the trough therein, said second conveyor carrying the material in intimate relation with the saw assemblies from one end thereof to the other in the opposite direction, means for stripping burrs and trash from the assembly, and means for stripping cotton from said saw assembly.

FLETCHER LANE.